UNITED STATES PATENT OFFICE.

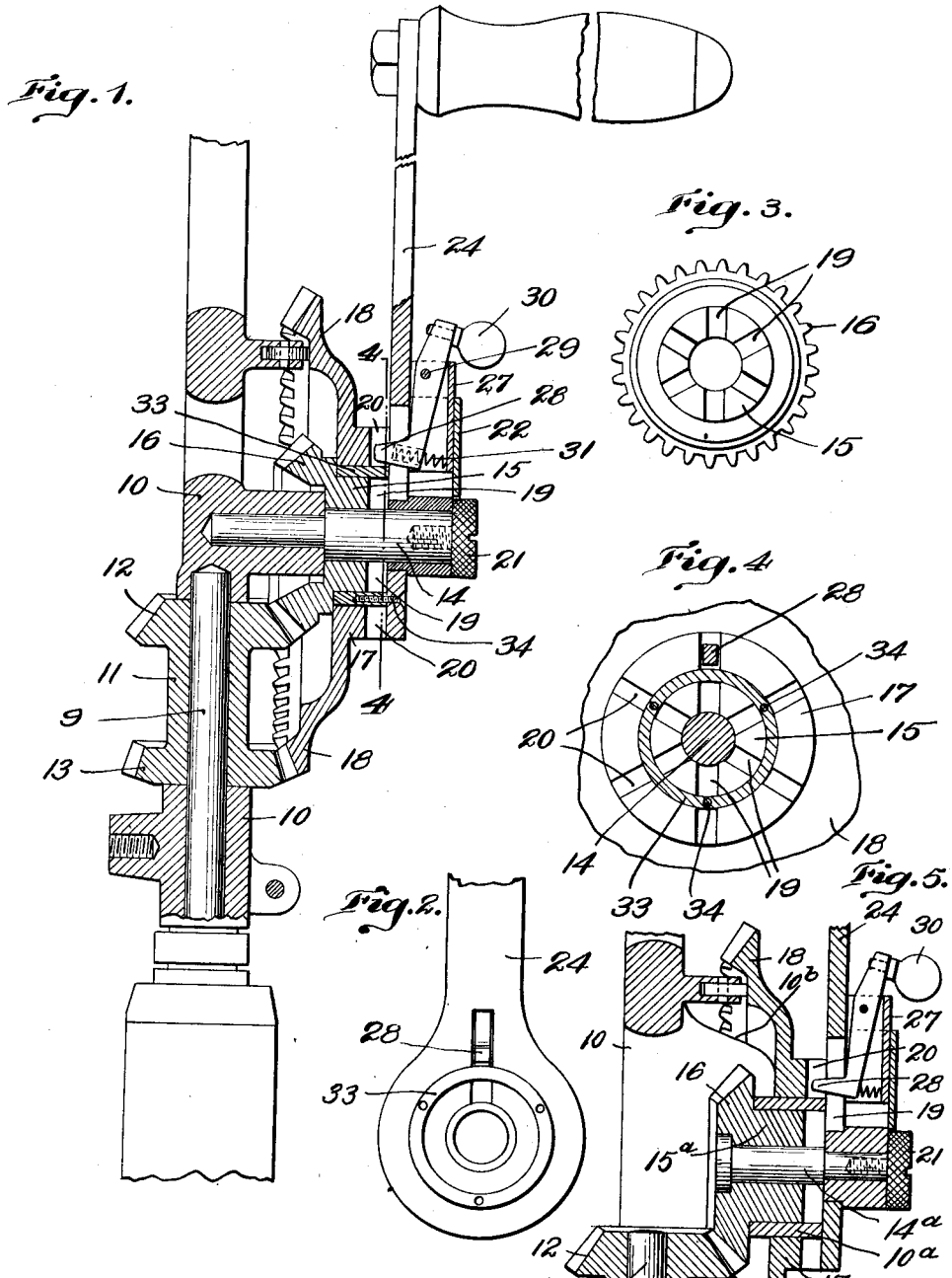

HENRY A. RYTHER, OF MONTAGUE, MASSACHUSETTS, ASSIGNOR TO MILLERS FALLS COMPANY, OF MILLERS FALLS, MASSACHUSETTS, A CORPORATION OF MASSACHUSETTS.

CHANGE-SPEED GEARING.

1,034,838.   Specification of Letters Patent.   Patented Aug. 6, 1912.

Application filed December 15, 1911. Serial No. 666,043.

*To all whom it may concern:*

Be it known that I, HENRY A. RYTHER, a citizen of the United States, and a resident of Montague, in the county of Franklin and State of Massachusetts, have invented certain new and useful Improvements in Change-Speed Gearing, of which the following is a specification.

This invention relates to tools of the type known as breast drills, and the invention refers particularly to the structure of the gearing which is employed for changing speed, although my invention is not limited to this particular type of implement.

Obviously the gearing may be employed for driving or rotating a tool other than a drill.

In the Patent No. 988,723, granted April 4, 1911, to John A. Leland, there is disclosed and claimed a change speed gearing that is especially adapted for breast drills. The mechanism of that structure embodies two bevel gears of different sizes, the hub of one being mounted directly upon the hub of the other. This causes unusual friction, and the object of my present invention is to provide the two driving gears with independent bearings, so as to require less power for operating the tool, by reducing the amount of friction.

To these ends, my invention consists in an implement of the character described, having two driving gears rotating concentrically, but having independent bearings or spindles.

My invention further consists of improvements which I will now proceed to describe and claim.

Of the accompanying drawings,—Figure 1 is a side elevation partly in section of sufficient parts of the breast drill embodiment, to illustrate the present invention. Fig. 2 is an inner face view of a portion of the crank and its hub, detached. Fig. 3 is a detail elevation of the smaller driving bevel gear, looking from the outer end of the hub thereof. Fig. 4 is a detail section on line 4—4 of Fig. 1, looking toward the left. Fig. 5 is a view similar to a portion of Fig. 1, but illustrating a modification hereinafter described.

Similar reference characters indicate the same or similar parts in all of the views.

A portion of the chuck operating spindle 9 is supported by a hollow shaft or sleeve 10 being secured to said spindle. Integral with or secured to the hollow shaft or sleeve 11 are two bevel gears or pinions 12 and 13. The frame also carries a stud 14 on which is mounted the hub 15 of a bevel driving gear 16. Surrounding the hub 15, but separated therefrom by the sleeve bearing presently described is the hub 17 of the large driving bevel gear 18. The small gear 16 is in mesh with the pinion 12, and the large gear 18 meshes with the pinion 13. It is to be understood, of course, that the speed of rotation of the spindle 9 and the tool (not shown) carried thereby, will depend upon which of the gears 16 or 18 is being used as the driving gear, the other one then running idle.

The end faces of the hubs 15 and 17 are flush and are formed with radial notches 19 and 20 respectively. Rotatably mounted on the end of the stud 14 is a crank 24 to which is secured a block 22 containing a sliding housing 27 for a latch 28 which is adapted to engage either one of the series of notches 19 or 20 in somewhat the manner described in the Leland patent referred to. The latch 28 is pivoted at 29 and has a knob 30 the toe of the latch being normally held in the position shown in Fig. 1, by means of a spring 31. The structure and operation of the latch is substantially the same as in the said Leland patent, the sliding housing 27 enabling the latch to be shifted so that its toe will engage a notch or recess of the hub 15, or a notch or recess of the hub 17, said latch projecting through a slot of the crank 24 so that when the said crank is actuated it will rotate either the larger or the smaller driving gear, according to which one it is coupled to, by means of the latch 28.

My present invention is embodied chiefly in the sleeve bearing 33 which is interposed between the hubs 15 and 17, said sleeve bearing being carried by the hub of the crank 24. The sleeve bearing might be integral with said hub, but it is illustrated as a cylindrical member separate from the crank or its hub and secured thereto by screws 34.

The pivotal and sliding mounting of the latch enables its toe to be either in the position shown in Fig. 1 or shifted to engage one of the notches 19 in the hub 15 of the smaller driving gear. The presence of the bearing acts as a stop or barrier that will prevent the latch from slipping from one position to the other, that is, it could not be shifted from the position shown in Fig. 1 to engage the hub of the smaller driving gear, without first swinging the latch on its pivot and then sliding the housing toward the axis of rotation to cause the toe of the latch to pass the edge of the sleeve bearing and then releasing the latch so that its toe will enter a recess 19.

When the latch is in the position shown in Fig. 1 the crank so carries the tubular or sleeve bearing 33 that there will be no friction between the said hub of the larger gear and the bearing on which it is mounted. In practice, there might be some little space between the inside of the sleeve bearing and the exterior surface of the hub 15 of the smaller driving gear, because the larger gear is mounted on the tubular or sleeve bearing and the latter is carried by the crank while the hub of the latter is mounted on the stud 14. In effect therefore, the outer end of the stud 14 constitutes the bearing for the larger driving gear 18, while the hub 15 of the smaller driving gear rotates on another portion of the stud 14. Consequently the two driving gears have independent bearings. When, however, the latch is shifted so that the crank is locked to the smaller driving gear, then the larger gear is driven idly by reason of the smaller gear 16 acting through the bevel pinions 12 and 13. At such time, of course, the larger gear is rotating much more slowly than the crank. In other words, the sleeve bearing 33 is rotating within the hub of the larger driving gear 18, but still providing a bearing for said larger gear which is entirely independent of the bearing of the smaller driving gear. Practically the structure includes one gear running within another, but still each having an independent bearing whereby there is far less friction and consequently less operating power required than in the structure shown in the Leland patent referred to.

In Fig. 5 I illustrate a structure wherein the sleeve bearing, instead of being a member carried by the crank 24, is a portion of the frame, as indicated at $10^a$. The sleeve bearing $10^a$ may be integral with a web portion $10^b$ of the frame, or may be secured thereto in any suitable or preferred manner, so as to be interposed between the hub 17 of the large driving gear and the hub $15^a$ of the smaller driving gear 16. Through the gear 16 and its hub $15^a$, a bolt $14^a$ passes, the head of the bolt bearing against the inner face of the gear and having the crank 24 mounted on its outer end and held by a screw 21. With this structure, the outer surface of the sleeve $10^a$ forms a bearing for the large gear and the inner surface forms a bearing for the smaller gear.

I claim:—

1. An implement of the character described having speed change gearing including two driving gears of different sizes, independent bearings for said gears, said gears having notched hub ends which are substantially flush, and a crank having a latch adjustable toward and from the axis of rotation of the crank to engage a notch of either hub.

2. An implement of the character described having change speed gearing, including two gears, one running within the other, an independent bearing for each gear, said gears having notched hub ends which are substantially flush, and a crank having a latch adjustable toward and from the axis of rotation of the crank to engage a notch of either hub.

3. An implement of the character described, comprising a spindle, bevel pinions for rotating said spindle, two co-axially mounted driving gears meshing with the said bevel pinions respectively, a stud bearing for one of the driving gears, a crank having a sleeve bearing for the other driving gear, and means for connecting the crank to either one of the two gears to rotate it.

4. In change speed gearing, a plurality of gears having concentrically mounted hubs provided with recesses in their ends, a stud bearing for the inner hub, a rotary operating member having a sleeve bearing for the outer hub, and a locking device carried by said operating member adjustable to engage a recess of either of said hubs.

In testimony whereof I have affixed my signature, in presence of two witnesses.

HENRY A. RYTHER.

Witnesses:
KATHERINE E. NICHOLS,
LIZZIE B. STRACHAN.

---

Copies of this patent may be obtained for five cents each, by addressing the "Commissioner of Patents, Washington, D. C."